UNITED STATES PATENT OFFICE.

HENRIK J. KREBS, OF WILMINGTON, DELAWARE.

METHOD OF RECOVERING CHROMATES FROM TAN LIQUOR.

SPECIFICATION forming part of Letters Patent No. 620,935, dated March 14, 1899.

Application filed November 3, 1897. Serial No. 657,280. (No specimens.)

*To all whom it may concern:*

Be it known that I, HENRIK J. KREBS, of Wilmington, New Castle county, Delaware, have invented an Improvement in Methods of Recovering Chrome from Spent Tannage Liquors, of which the following is a specification.

My invention relates to a method of recovering chrome from spent tannage liquors, and is fully described and claimed hereinafter.

In the process of manufacturing morocco and other leathers chromate-baths are frequently employed in the tannage, in which the skins are subjected to one or more baths, and the liquor thus used becoming contaminated by organic matter and other impurities dissolved from the skins is rendered unfit for further use and has heretofore been allowed to go to waste. The spent liquor is found to contain quantities of organic matter dissolved from the skins, earthy matter, lime in small quantities, aluminium, and flesh and small pieces of skin detached from the pelts; but even when the liquor has been used to obtain the fullest benefit from the chromates the spent liquor contains a considerable quantity of chromic acid, which has heretofore been wasted. I have found that the chromic acid contained in these spent liquors, which is now wasted, can be recovered and satisfactorily utilized for chrome colors.

Chromic acid forms two salts, the normal and the bichromates, which readily pass from one into the other, according to the quantities of bases with which they are combined, the temperature, and other conditions; and as both forms are found in the spent tannage liquors and readily pass from one to the other I shall not attempt to distinguish between the normal and bichromates in the specification or claims, and it is to be understood that I mean to include either or both forms.

In carrying out my invention I first purify the spent liquor by freeing it from the organic matter and other impurities which it contains, and then precipitate and recover the chrome contained in the purified liquor, preferably in the form of lead or barium chromates. There is considerable demand for lead chromate and some market for the barium chromate, sometimes known as "yellow ultramarine." The purification of the spent liquor to remove the organic matter and other impurities is accomplished by the use of caustic lime or equivalent caustic earth or caustic. When the impurities are precipitated by the use of caustic lime, the lime dissolved in the liquor may be precipitated either as sulphate of lime, ($CaOSO_3$,) oxalate of lime, ($CaOC_2O_3$,) or carbonate of lime ($CaOCO_2$) by the use of sulphuric acid, oxalic acid, or carbonic acid, according to the following formulæ:

(1) $CaO + H_2SO_4 = CaOSO_3 + H_2O$.

(2) $CaO + C_2O_3 + 4Aq = CaOC_2O_3 + 4Aq$.

(3) $CaO + CO_2 = CaOCO_2$.

The precipitate may then be removed by decantation or filtration, leaving a purified liquor containing chrome. The chrome contained in this purified liquor is then precipitated, and to facilitate the precipitation the liquor should be heated and kept well stirred. The precipitation of the chrome may be effected by the addition to the liquor, which is more or less dilute, of lead oxide or lead salts in solution, which will precipitate lead chromates, or by the addition of barium oxide or barium salts in solution, which will produce barium chromates. In the former case the lead oxide, (PbO,) which is insoluble in the liquid, is added in a very finely-disintegrated condition, and, reacting with the chromate of potash ($K_2Cr_2O_7$) in the liquor, will produce a basic chromate of lead ($Pb_2CrO_5$) and potash according to the following formula:

$$4(PbO) + K_2Cr_2O_7 = 2(Pb_2CrO_5) + K_2O.$$

This method does not, however, produce as fine a division as is effected between two liquors, and therefore I prefer to use lead in solution, as basic acetate of lead, $2(C_2H_3O_2Pb)O$, or nitrate of lead ($PbON_2O_5$) or chloride of lead ($PbCl_2$.)

The plumbic acetate reacting with the chromate of potash produces normal chromate of lead ($PbCrO_4$) and normal potasium acetate according to the following formula:

$$2(C_2H_3O_2Pb)O + K_2Cr_2O_7 = 2(PbCrO_4) + 2(C_2H_3O_2K).$$

The nitrate of lead produces normal chromate of lead and nitrate of potash, according to the following formula:

$$2(PbO)N_2O_5 + K_2Cr_2O_7 = 2(PbCrO_4) + 2(KONO_2).$$

The chloride of lead reacting with the chromate of potash and water produces chromate of lead, chloride of potash, and hydrochloric acid, according to the following formula:

$$2(PbCl_2) + K_2Cr_2O_7 + H_2O = 2(PbOCrO_3) + 2KCl + 2HCl.$$

The chrome may be precipitated as barium chromates by the use of barium hydroxide ($BaOH_2O$) or barium chloride ($BaCl_2$.)

The barium hydroxide reacting with the chromate of potash produces chromate of barium and potash, according to the following formula:

$$2(BaOH_2O) + K_2Cr_2O_7 = 2(BaOCrO_3) + K_2O + 2(H_2O),$$

and the chloride of barium reacts with the chromate of potash and water to produce barium chromate, chloride of potash, and hydrochloric acid, according to the following formula:

$$2(BaCl_2) + K_2Cr_2O_7 + H_2O = 2(BaOCrO_3) + 2(KCL) + 2(HCl).$$

The chromate precipitated in whatever manner produced is removed from the liquor by filtration, decantation, or in any other manner and is dried and suitably finished for the market. It can be sold in this state without further admixture of ingredients; but, if desired, it may be mixed with other ingredients—such, e. g., as white lead of barytes.

Having now described my invention, what I claim as new, and desire to secure by Letters Patent, is as follows:

1. The herein-described method of recovering chromic acid from spent tannage liquors, which consists in purifying the liquor by precipitation substantially in the manner described and then precipitating the chromic acid contained in said purified liquor by a chemical substance containing a metal, which reacting with the chromic acid in the liquor will produce a chromate of such metal as a precipitate.

2. The herein-described method of recovering chromic acid from spent tannage liquors, which consists in first purifying the liquor by precipitation substantially in the manner described, and then precipitating the chromic acid contained therein as chromate of lead.

3. The herein-described method of recovering the chromic acid from spent tannage liquors, which consists in first precipitating the dissolved impurities contained in said liquor by caustic lime, removing the precipitate and then precipitating the chromic acid.

4. The herein-described method of recovering the chromic acid from spent tannage liquors, which consists in first precipitating the dissolved impurities contained in said liquor by caustic lime, removing the precipitate and then precipitating the chromic acid as chromate of lead, and removing such precipitated chromate.

In testimony of which invention I hereunto set my hand.

HENRIK J. KREBS.

Witnesses:
J. JACKSON PEIRCE,
J. BAIL PEIRCE.